(12) United States Patent
Yasutake et al.

(10) Patent No.: US 8,992,871 B2
(45) Date of Patent: Mar. 31, 2015

(54) CO SHIFT CATALYST, CO SHIFT REACTOR, AND METHOD FOR PURIFYING GASIFIED GAS

(75) Inventors: Toshinobu Yasutake, Hiroshima (JP); Tetsuya Imai, Tokyo (JP); Masanao Yonemura, Hiroshima (JP); Susumu Okino, Hiroshima (JP); Keiji Fujikawa, Hiroshima (JP); Shinya Tachibana, Hiroshima (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 727 days.

(21) Appl. No.: 13/262,848

(22) PCT Filed: Apr. 10, 2009

(86) PCT No.: PCT/JP2009/057377
§ 371 (c)(1),
(2), (4) Date: Oct. 4, 2011

(87) PCT Pub. No.: WO2010/116531
PCT Pub. Date: Oct. 14, 2010

(65) Prior Publication Data
US 2012/0027659 A1 Feb. 2, 2012

(51) Int. Cl.
*B01J 23/882* (2006.01)
*B01J 21/06* (2006.01)
(Continued)

(52) U.S. Cl.
CPC .............. *B01J 23/882* (2013.01); *B01J 21/063* (2013.01); *B01J 21/066* (2013.01); *B01J 23/28* (2013.01);
(Continued)

(58) Field of Classification Search
USPC .......... 502/321, 305, 255, 309, 350, 242, 304, 502/260; 423/655, 656, 247; 422/168, 177; 252/373
See application file for complete search history.

(56) References Cited

U.S. PATENT DOCUMENTS 4,881,366 A * 11/1989 Nurse .............................. 60/772
5,152,976 A * 10/1992 Fong et al. ..................... 423/652

FOREIGN PATENT DOCUMENTS

CN 1219500 A 6/1999
CN 1219500 A * 6/1999 ............... B01J 23/85
(Continued)

OTHER PUBLICATIONS

Laniecki et al, "Water-gas shift reaction over sulfided molybdenum catalysts supported on TiO2—ZrO2 mixed oxides Support characterization and catalytic activity," Catalysis Today 116 (2006) 400-407.*
(Continued)

*Primary Examiner* — Stanley Silverman
*Assistant Examiner* — Kallambella Vijayakumar
(74) *Attorney, Agent, or Firm* — Westerman, Hattori, Daniels & Adrian, LLP

(57) ABSTRACT

A CO shift catalyst according to the present invention reforms carbon monoxide (CO) contained in gas. The CO shift catalyst is prepared from one or both of molybdenum (Mo) and cobalt (Co) as an active ingredient and an oxide of one of, or a mixture or a compound of, titanium (Ti), silicon (Si), zirconium (Zr), and cerium (Ce) as a carrier for supporting the active ingredient. The CO shift catalyst can be used in a halogen-resistant CO shift reactor (15) that converts CO contained in gasified gas (12) generated in a gasifier (11) into $CO_2$.

3 Claims, 2 Drawing Sheets

(51) Int. Cl.
- B01J 21/12 (2006.01)
- C01B 3/16 (2006.01)
- C10K 3/04 (2006.01)
- B01J 23/887 (2006.01)
- C01B 3/52 (2006.01)
- C01B 3/56 (2006.01)
- C10K 1/02 (2006.01)
- C10K 1/08 (2006.01)
- C10K 1/12 (2006.01)
- C10J 3/00 (2006.01)
- B01J 23/28 (2006.01)
- B01J 23/75 (2006.01)
- B01J 37/00 (2006.01)
- B01J 37/02 (2006.01)
- B01J 37/03 (2006.01)

(52) U.S. Cl.
CPC .............. *B01J 23/75* (2013.01); *B01J 23/8871* (2013.01); *B01J 37/0009* (2013.01); *B01J 37/0201* (2013.01); *B01J 37/0205* (2013.01); *B01J 37/031* (2013.01); *C01B 3/16* (2013.01); *C01B 3/52* (2013.01); *C01B 3/56* (2013.01); *C01B 2203/0283* (2013.01); *C01B 2203/0415* (2013.01); *C01B 2203/043* (2013.01); *C01B 2203/0465* (2013.01); *C01B 2203/0475* (2013.01); *C01B 2203/06* (2013.01); *C01B 2203/147* (2013.01); *C01B 2203/84* (2013.01); *C10J 2300/093* (2013.01); *C10J 2300/0959* (2013.01); *C10J 2300/1618* (2013.01); *C10J 2300/165* (2013.01); *C10J 2300/1671* (2013.01); *C10J 2300/1675* (2013.01); *C10J 2300/1678* (2013.01); *C10J 2300/1687* (2013.01); *C10K 1/024* (2013.01); *C10K 1/08* (2013.01); *C10K 1/12* (2013.01); *C10K 3/04* (2013.01); *C10J 3/00* (2013.01); *Y02E 20/16* (2013.01); *Y02E 20/18* (2013.01)

USPC .......... 423/247; 423/656; 502/321; 502/308; 502/255; 502/309; 502/304; 422/138; 252/373

(56) References Cited

FOREIGN PATENT DOCUMENTS

| JP | 59-002537 A | 1/1984 | |
|----|---|---|---|
| JP | 60-156553 A | 8/1985 | |
| JP | 8-173809 A | 7/1996 | |
| JP | 2003-080072 A | 3/2003 | |
| JP | 2004-331701 A | 11/2004 | |
| JP | 2004331701 A * | 11/2004 | ............... C10K 1/34 |
| JP | 2008-155181 A | 7/2008 | |
| JP | 2008-161742 A | 7/2008 | |

OTHER PUBLICATIONS

Chinese Office Action dated Jan. 14, 2013, issued in corresponding Chinese Patent Application No. 200980158504.3, w/ English translation.

International Search Report of PCT/JP2009/057377, mailing date Jul. 21, 2009.

Written Opinion of PCT/JP2009/057377, mailing date Jul. 21, 2009.

Decision of a Patent Grant dated Oct. 1, 2013, issued in corresponding Japanese Patent Application No. 2011-508173, w/ English translation.

Australian Notice of Acceptance dated Nov. 28, 2013, issued in corresponding Australian Application No. 2009343840.

Chinese Notification of Grant of Invention Patent dated Apr. 9, 2014, issued in corresponding Chinese Patent Application No. 200980158504.3 with English translation (4 pages).

* cited by examiner

CO SHIFT CATALYST, CO SHIFT REACTOR, AND METHOD FOR PURIFYING GASIFIED GAS

FIELD

The present invention relates to a CO shift catalyst that converts CO contained in gasified gas into $CO_2$, a CO shift reactor using the CO shift catalyst, and a method for purifying gasified gas.

BACKGROUND

Effective utilization of coal has attracted attention as one of the possible solutions to recent energy issues.

To convert coal to a highly value-added energy medium, advanced technologies, such as a coal gasification technology and a gas purification technology, are required.

An Integrated Coal Gasification Combined Cycle that generates electricity using gasified gas has been proposed (Patent Literature 1).

The Integrated Coal Gasification Combined Cycle (IGCC) is a system that converts coal into combustible gas in a high-temperature and high-pressure gasifier and generates electricity through a combined cycle with a gas turbine and a steam turbine by using the gasified gas as fuel.

An example of the above is illustrated in FIG. 2. FIG. 2 is an explanatory diagram of a coal gasification power plant according to a conventional technology. As illustrated in FIG. 2, a coal gasification power plant 100 gasifies coal 101 in a gasifier 102 to obtain gasified gas 103 as synthesis gas, removes dust from the gas in a dust removal apparatus 104, such as a scrubber, converts COS into $H_2S$ in a COS converter 105, causes a CO shift reaction to occur in a CO shift reactor 106, and recovers $CO_2$ and removes $H_2S$ in an $H_2S/CO_2$ recovery apparatus 107.

Synthesis gas 108 obtained through treatment by the $H_2S/CO_2$ recovery apparatus 107 is supplied to a combustor 111 in a gas turbine 110 being a power generating means, where the synthesis gas is fired and high-temperature and high-pressure combustion gas is produced. A turbine 112 is driven by the combustion gas. The turbine 112 is connected to a power generator 113 so that the power generator 113 generates electricity when the turbine 112 is driven. Flue gas 114 produced by the driving of the turbine 112 has, a temperature of 500 to 600° C. Therefore, it is preferable to feed the flue gas to an HRSG (Heat Recovery Steam Generator (an exhaust heat recovery boiler)) 115 in order to recover heat energy. In the HRSG 115, steam is produced by the heat energy of the flue gas. A steam turbine 116 is driven by the steam. The flue gas whose heat energy is recovered by the HRSG 115 is fed to a denitrification apparatus (not illustrated) to remove NOx from the flue gas and thereafter released into the air through a stack 117. In FIG. 2, a reference numeral 120 denotes air, 121 denotes an air separator, 122 denotes a gasification air compressor, 123 denotes gasification air, 124 denotes steam, and 125 denotes an $H_2S/CO_2$ treatment system.

As described above, for the gasified gas 103 obtained through the gasification in the gasifier 102, the CO shift reactor 106 that converts CO contained in the gasified gas into $CO_2$ is needed before the $CO_2$ is separated.

The CO shift reaction is performed to obtain $CO_2$ and $H_2$ as useful components as expressed by the following Expression (1).

$$CO + H_2O \rightarrow CO_2 + H_2 \tag{1}$$

Various CO shift catalysts have been proposed as catalysts for promoting the CO shift reaction. Examples of the catalysts include an aluminum oxide supported molybdenum (Mo)-cobalt (Co) based catalyst (Patent Literature 2).

The CO shift reactor 106 converts a large amount of CO contained in the gasified gas 103 into $H_2$. Therefore, the obtained gas is also used for the synthesis of chemical products, such as ethanol or ammonia, in addition to be used for turbines.

CITATION LIST

Patent Literature

Patent Literature 1: Japanese Patent Application Laid-open No. 2004-331701
Patent Literature 2: Japanese Patent Publication No. S59-2537

SUMMARY

Technical Problem

The coal 101 as the fuel contains halogen (mainly Cl), and when the coal is gasified by a partial oxidation reaction in the gasifier 102, hydrogen chloride (HCl) is produced, which attacks and deteriorates aluminum oxide being the carrier of the CO shift catalyst.

Therefore, the coal gasification power plant 100 is required to adequately remove the hydrogen chloride (HCl) on the upstream side of the CO shift reactor 106. For this purpose, it is necessary to set up the dust removal apparatus 104, such as a scrubber, of a gas-liquid contact type. However, to remove the HCl in the dust removal apparatus 104, it is necessary to temporarily lower the temperature of the gasified gas 103 from 350° C. to about 160° C., which is disadvantageous in terms of the thermal efficiency.

Therefore, it has been demanded to develop a high-performance catalyst that can hardly be deteriorated even with the hydrogen chloride (HCl).

In view of the above problem, it is an object of the present invention to provide a CO shift catalyst that can hardly be deteriorated even with hydrogen chloride (HCl), a CO shift reactor using the CO shift catalyst, and a method for purifying gasified gas.

Solution to Problem

According to an aspect of the present invention, a CO shift catalyst that reforms carbon monoxide (CO) in a gas includes: one or both of molybdenum (Mo) and cobalt (Co) as an active ingredient; and at least one of titanium (Ti), silicon (Si), zirconium (Zr), and cerium (Ce) as a carrier for supporting the active ingredient.

Advantageously, in the CO shift catalyst, the carrier is a complex oxide of at least two types of elements.

Advantageously, in the CO shift catalyst, the carrier is a complex oxide of aluminum (Al) and at least one of titanium (Ti), silicon (Si), zirconium (Zr), and cerium (Ce).

Advantageously, in the CO shift catalyst, an additive amount of molybdenum (Mo) is 1 to 50% by weight, and an additive amount of cobalt (Co) is 1 to 30% by weight.

According to another aspect of the present invention, a CO shift reactor includes a reactor that is filled with any one of the CO shift catalyst above described.

According to still another aspect of the present invention, a method for purifying gasified gas includes: removing soot and dust from gasified gas containing halide by using a filter, the gasified gas being obtained by a gasifier; causing a CO shift reaction by using any one of the CO shift catalyst above described; cleaning the gasified gas by a wet scrubber after the CO shift reaction; and removing carbon dioxide from the gasified gas after the cleaning.

Advantageous Effects of Invention

According to the present invention, a halogen-resistant catalyst is provided, so that a wet scrubber can be placed on the downstream side of a CO shift reactor. Therefore, it is possible to perform a CO shift reaction without temporarily lowering a gas temperature, enabling to improve the energy efficiency.

Furthermore, even when the catalyst is used in any known reactor equipments, because the catalyst has resistance to slip halide, it is possible to improve the reliability.

DESCRIPTION OF EMBODIMENTS

Hereinafter, the present invention will be described in detail with reference to the drawings. However, the present invention is not limited to embodiments described below. The components in the following embodiments include those readily apparent to persons skilled in the art and those substantially similar thereto.

Embodiments

Figure 1:
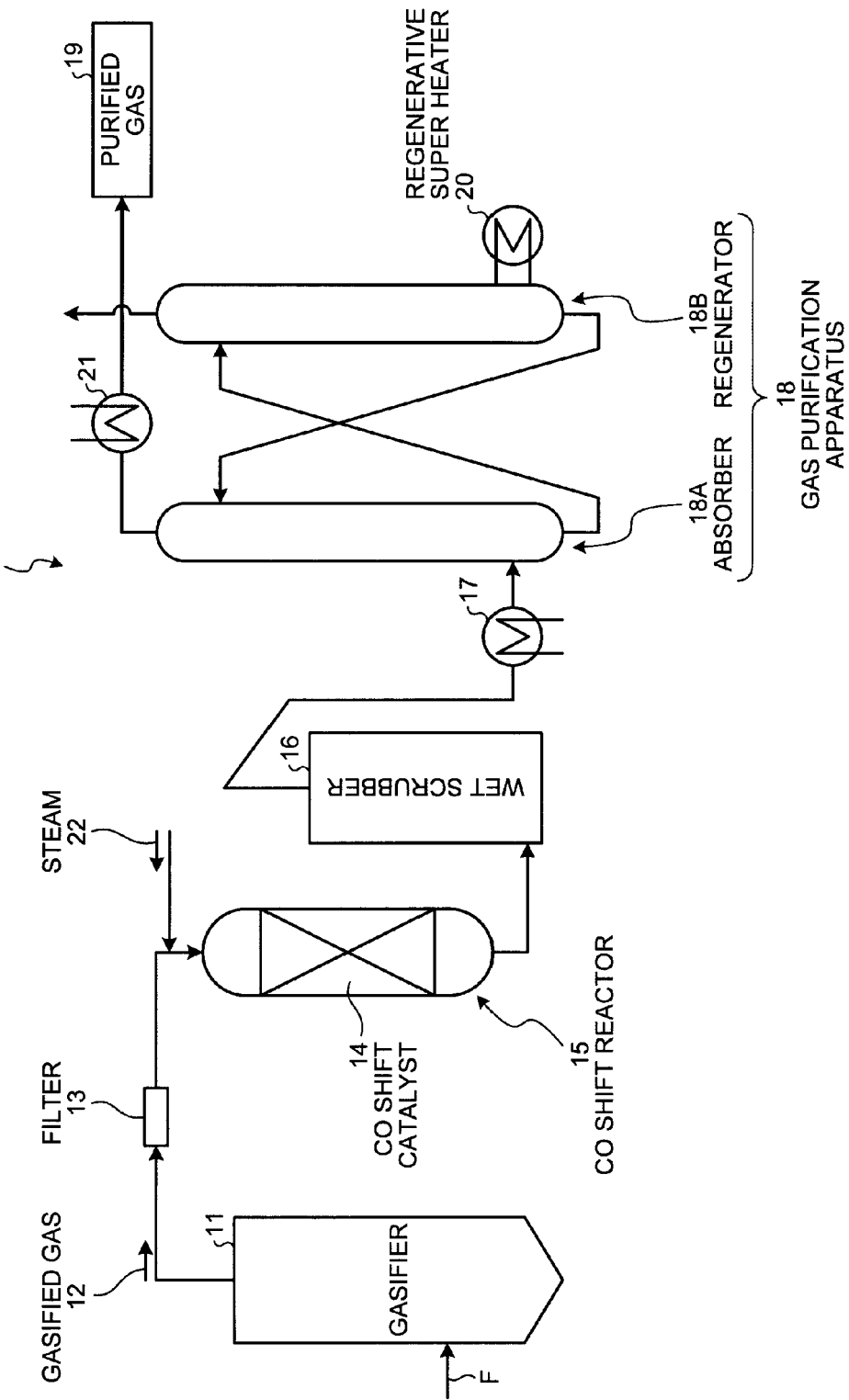
FIG. 1 is a schematic diagram of a gasified gas purification system that includes a CO shift reactor filled with a CO shift catalyst.
Figure 2:
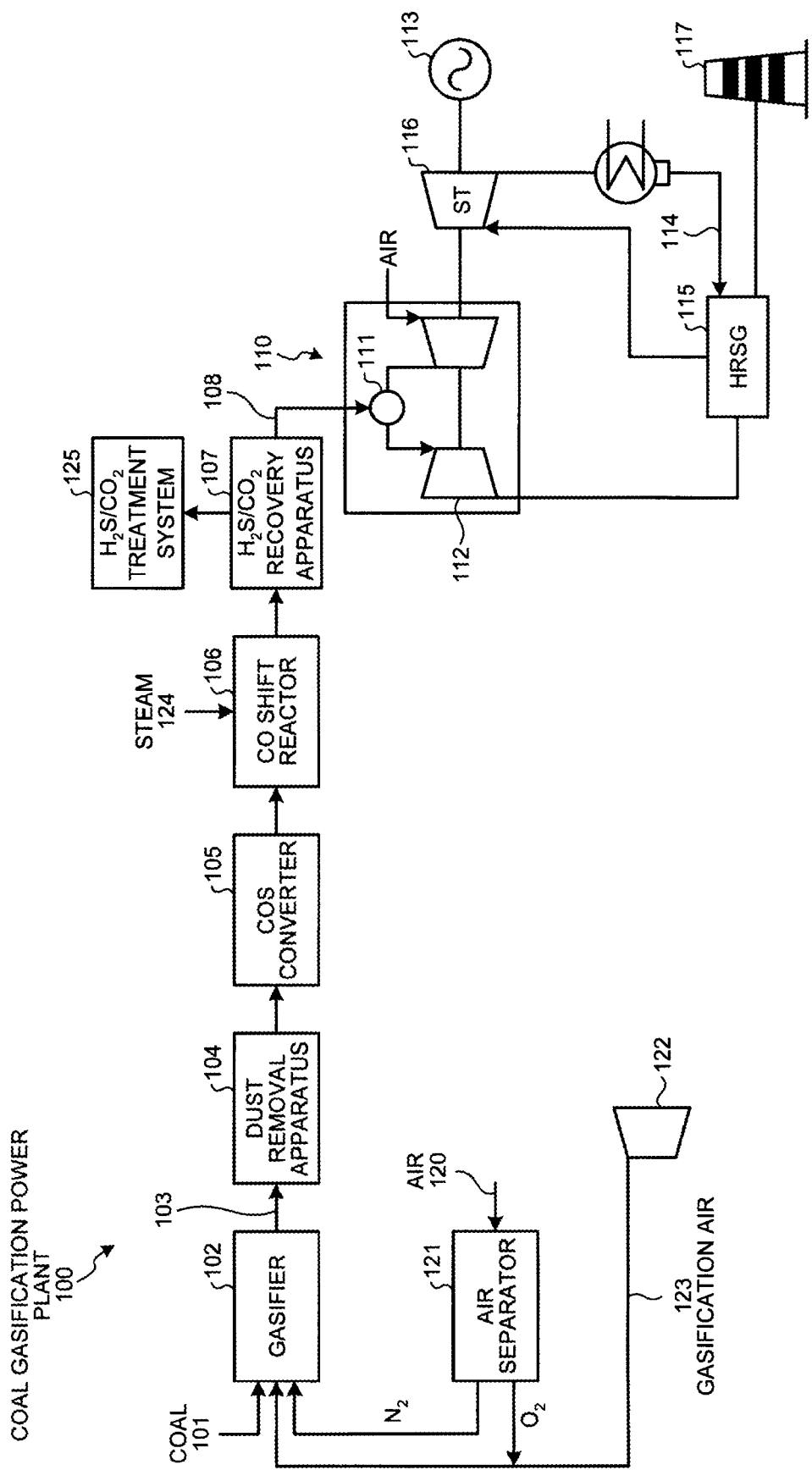
FIG. 2 is an explanatory diagram of a coal gasification power plant according to a conventional technology.

A CO shift catalyst and a CO shift reactor using the CO shift catalyst according to embodiments of the present invention will be described with reference to the drawings. FIG. 1 is a schematic diagram of a gasified gas purification system that includes a CO shift reactor filled with a CO shift catalyst.

As illustrated in FIG. 1, a gasified gas purification system 10 includes a gasifier 11 that gasifies coal as fuel F; a filter 13 that removes soot and dust from gasified gas 12 that is synthesis gas; a CO shift reactor 15 with a CO shift catalyst 14 that converts CO contained in the gasified gas 12 into $CO_2$; a wet scrubber 16 that removes halogen from the gasified gas 12 after the CO shift reaction; a first heat exchanger 17 that lowers the temperature of the gasified gas 12; and a gas purification apparatus 18 that includes an absorber 18A for absorbing $CO_2$ contained in the gasified gas 12 after heat exchange and a regenerator 18B for recovering the $CO_2$.

In FIG. 1, a reference numeral 20 denotes a regenerative super heater, 21 denotes a second heat exchanger for heating the gasified gas 12, and 22 denotes steam.

A CO shift catalyst according to the present invention is a CO shift catalyst that reforms carbon monoxide (CO) contained in gas and is prepared from one or both of molybdenum (Mo) and cobalt (Co) as an active ingredient and an oxide of any one of, or a mixture or a compound of, titanium (Ti), silicon (Ci), zirconium (Zr), and cerium (Ce) as a carrier for supporting the active ingredient.

By using any one of titanium (Ti), silicon (Ci), zirconium (Zr), and cerium (Ce) as the carrier, the catalyst becomes resistant to halide contained in the gasified gas. Therefore, it is possible to immediately cause the CO shift reaction of the gasified gas 12 that is gasified in the gasifier 11.

As shown in test examples described below, according to a result of measurement of a CO conversion rate that is an indicator of the reaction efficiency of the CO shift reaction, the above property is confirmed by the fact that decline in the CO conversion rate (%) is low even after exposure to hydrogen chloride.

It is preferable to employ any of oxides $TiO_2$, $SiO_2$, $ZrO_2$, and $CeO_2$ as the carrier.

The carrier may be a complex oxide containing at least any two of the above elements. Also, the carrier may be a combination of the complex oxide and any mixture.

Examples of the complex oxide obtained as above include $TiO_2$—$ZrO_2$, $TiO_2$—$SiO_2$, $TiO_2$—$CeO_2$, $CeO_2$—$ZrO_2$, and $SiO_2$—$ZrO_2$.

As another example, the complex oxide may be a combination of any one of the oxides $TiO_2$, $SiO_2$, $ZrO_2$, and $CeO_2$ with $Al_2O$, such as $TiO_2$—$Al_2O_3$ or $ZrO_2$—$Al_2O_3$. $Al_2O_3$ contained in the complex oxide cannot be the carrier by itself because it causes significant deterioration by halogen as shown in the test examples described below. However, if $Al_2O_3$ is combined with $TiO_2$ or the like into the complex oxide, it is possible to reduce the deterioration; therefore, the complex oxide can be applied as the carrier.

The additive amount of the molybdenum (Mo) as the active ingredient is preferably 1 to 50% by weight, and more preferably, 6 to 18% by weight.

The additive amount of cobalt (Co) is preferably 1 to 30% by weight, and more preferably, 2 to 9% by weight.

According to the present invention, it is possible to cause a CO shift reaction to occur in the CO shift reactor 15 having the CO shift catalyst 14, purify the gasified gas in the wet scrubber 16 after the CO shift reaction, and remove carbon dioxide from the gasified gas, thereby obtaining purified gas 19.

According to the embodiments, as illustrated in FIG. 1, the gasified gas 12 from the gasifier 11 has a high temperature of 350° C. and the CO shift reactor 15 causes the CO shift reaction to occur while the gas temperature is maintained. Therefore, the gas temperature is not lowered, so that energy loss is reduced.

In the embodiments, after the reaction in the CO shift reactor 15 is complete, the gas temperature is lowered in the wet scrubber 16 and halide is removed from the gas. Thereafter, the gas is purified in the gas purification apparatus 18 that includes the absorber 18A and the regenerator 18B. Therefore, unlike the conventional technology, it is not necessary to lower the temperature once in a scrubber and then increase the temperature again to cause the CO shift reaction to occur in the CO shift reactor 106. Consequently, it is possible to construct a system structure with good heat balance.

For the gas purification apparatus, various $CO_2$ and $H_2S$ purification methods, such as chemisorption or physisorption, have been proposed, and the methods are not limited to those described herein.

Meanwhile, COS is mixed in the gasified gas 12. Therefore, it is possible to set up a COS catalytic converter on the upstream side or the downstream side of the CO shift reactor 15 or it is possible to remove COS by a physisorption means in the gas purification apparatus 18.

As described above, according to the present invention, it is not necessary to be concerned about deterioration due to halogen contained in the coal F when the coal is gasified in the gasifier 11. Therefore, it is possible to significantly reduce restrictions on the set-up location of the CO shift reactor 15.

Consequently, it is possible to cause the CO shift reaction to occur while the gas has a high temperature on the downstream side of the gasifier 11. As a result, it is possible to realize a highly-efficient gas purification process with good thermal efficiency.

TEST EXAMPLES

Hereinafter, test examples indicating the advantageous effects of the present invention will be described.

Test Example 1-1

Impregnation (IMP) Method 83.3 g of titanium dioxide manufactured by ISHIHARA SANGYO KAISYA, LTD. ($TiO_2$ (product name: "MC-90")) was put in a porcelain dish, cobalt nitrate hexahydrate and ammonium molybdate tetrahydrate dissolved in 100 ml of water were added so that 4 wt % of CoO and 13 wt % of $MoO_3$ were supported with respect to the total amount of resultant powder. Thereafter, evaporation to dryness and impregnation were performed on the contents of the porcelain dish.

The obtained powder was completely dried by a drier and thereafter fired at 500° C. for 3 hours (the rate of temperature rise was 100° C./h), so that a powdered catalyst 1-1 was obtained. The supported amount (wt %/wt %) of $CoO/MoO_3$ in this test example was 4/13.

The obtained powdered catalyst 1-1 was put into a 30-ton pressing machine to immobilize the powder, crushed so that a particle diameter was in a range from 2 to 4 mm, and sifted, so that a catalyst 1-1 (the catalytic components: Mo, Co; and the carrier component: $TiO_2$) was obtained.

Test Example 1-2

Precipitation (PR) Method 83.3 g of titanium dioxide manufactured by ISHIHARA SANGYO KAISYA, LTD. ($TiO_2$ (product name: "MC-90")) was added to a beaker containing 3 L of water, and cobalt nitrate hexahydrate was added so that 4 wt % of CoO was supported with respect to the total amount of resultant powder.

The contents of the beaker were stirred to dissolve the cobalt nitrate. Thereafter, a few drops of a solution obtained by dissolving 2.5 mol % of sodium carbonate in 2 L of water were added while the stirring was continued, and precipitation was caused to occur.

Subsequently, ammonium molybdate tetrahydrate was added so that 13 wt % of $MoO_3$ was supported with respect to the total amount of the resultant powder and thereafter stirred and dissolved.

A few drops of a normal nitric acid aqueous solution were added while the stirring was continued, and precipitation was caused to occur.

Finally, the solution was cleaned and filtered by a centrifuge, dried, and fired at 500° C. for 3 hours (the rate of temperature rise was 100° C./h), so that a powdered catalyst 1-2 was obtained. The supported amount (wt %/wt %) of $CoO/MoO_3$ in this test example was 4/13.

The obtained powdered catalyst 1-2 was put into a 30-ton pressing machine to immobilize the powder, crushed so that a particle diameter was in a range from 2 to 4 mm, and sifted, so that a catalyst 1-2 (the catalytic components: Mo, Co; and the carrier component: $TiO_2$) was obtained.

Test Example 1-3

Coprecipitation (CPR) Method 260.3 g of titanyl sulfate manufactured by HAYASHI PURE CHEMICAL IND., LTD. ($TiOSO_4$ (containing 32% of $TiO_2$)) was added to a beaker containing 3 L of water, and cobalt nitrate hexahydrate was added so that 4 wt % of CoO was supported with respect to the total amount of resultant powder.

The contents of the beaker were stirred to dissolve the cobalt nitrate. Thereafter, a few drops of a solution obtained by dissolving 2.5 mol % of sodium carbonate in 2 L of water were added while the stirring was continued, and precipitation was caused to occur.

Subsequently, ammonium molybdate tetrahydrate was added so that 13 wt % of $MoO_3$ was supported with respect to the total amount of the resultant powder and thereafter stirred and dissolved.

A few drops of a normal nitric acid aqueous solution were added while the stirring was continued, and precipitation was caused to occur.

Finally, the solution was cleaned and filtered by a centrifuge, dried, and fired at 500° C. for 3 hours (the rate of temperature rise was 100° C./h), so that a powdered catalyst 1-3 was obtained. The supported amount (wt %/wt %) of $CoO/MoO_3$ in this test example was 4/13.

The obtained powdered catalyst 1-3 was put into a 30-ton pressing machine to immobilize the powder, crushed so that a particle diameter was in a range from 2 to 4 mm, and sifted, so that a catalyst 1-3 (the catalytic components: Mo, Co; and the carrier component: $TiO_2$) was obtained.

Test Example 1-4

Sol-Gel (SG) Method 83.3 g of titanium dioxide manufactured by ISHIHARA SANGYO KAISYA, LTD. ($TiO_2$ (product name: "MC-90")) was added to a beaker containing 3 L of water, 10 ml of a 1 mol·L solution of hydrochloric acid was added while the contents of the beaker were stirred. Thereafter, cobalt nitrate hexahydrate and ammonium molybdate tetrahydrate were added so that 4 wt % of CoO and 13 wt % of $MoO_3$ were supported with respect to the total amount of resultant powder.

Subsequently, the contents of the beaker were stirred and heated at 80° C. for 4 hours, and 150 ml of a 0.5% ammonia solution was added, so that a gelatinous precipitate was obtained.

Finally, the solution was cleaned and filtered by a centrifuge, dried, and fired at 500° C. for 3 hours (the rate of temperature rise was 100° C./h), so that a powdered catalyst 1-4 was obtained. The supported amount (wt %/wt %) of $CoO/MoO_3$ in this test example was 4/13.

The obtained powdered catalyst 1-4 was put into a 30-ton pressing machine to immobilize the powder, crushed so that a particle diameter was in a range from 2 to 4 mm, and sifted, so that a catalyst 1-4 (the catalytic components: Mo, Co; and the carrier component: $TiO_2$) was obtained.

Test Example 1-5

Copolymer Gel (CSG) Method 10 ml of a 1 mol·L solution of hydrochloric acid was added to a beaker containing 3 L of water while the contents of the beaker were stirred. Thereafter, cobalt nitrate hexahydrate and molybdenum chloride were added so that 4 wt % of CoO of and 13 wt % of $MoO_3$ were supported with respect to the total amount of resultant powder.

Subsequently, the contents of the beaker were stirred and heated at 80° C. for 5 hours, 283.9 g of titanium isopropoxide ($Ti(Oi-C_3H_7)_4$) was added, and the contents of the beaker were aged for 1 hour, so that a gelatinous precipitate was obtained.

Finally, the solution was cleaned and filtered by a centrifuge, dried, and fired at 500° C. for 3 hours (the rate of temperature rise was 100° C./h), so that a powdered catalyst 1-5 was obtained. The supported amount (wt %/wt %) of $CoO/MoO_3$ in this test example was 4/13.

The obtained powdered catalyst 1-5 was put into a 30-ton pressing machine to immobilize the powder, crushed so that a particle diameter was in a range from 2 to 4 mm, and sifted, so that a catalyst 1-5 (the catalytic components: Mo, Co; and the carrier component: $TiO_2$) was obtained.

Test Example 2

Change in Compositions and Materials in the Impregnation Method $TiO_2$ used in the test example 1 was changed to zirconium dioxide ($ZrO_2$) manufactured by HAYASHI PURE CHEMICAL IND., LTD., and the supported amount (wt %/wt %) of $CoO/MoO_3$ was changed to 2/10. Other than the above, the same operations as those of the test example 1-1 were performed to obtain a powdered catalyst 2.

The obtained powdered catalyst 2 was put into a 30-ton pressing machine to immobilize the powder, crushed so that a particle diameter was in a range from 2 to 4 mm, and sifted, so that a catalyst 2 (the catalytic components: Mo, Co; and the carrier component: $ZrO_2$) was obtained.

Test Example 3

Change in Compositions and Materials in the Impregnation Method $TiO_2/MoO_3$ material used in the test example 1 were changed to a 15% $ZrO_2$-85% $TiO_2$ complex oxide/ammonium thiomolybdate, and the supported amount (wt %/wt %) of $CoO/MoO_3$ was changed to 5/11. Other than the above, the same operations as those of the test example 1-1 were performed to obtain a powdered catalyst 3.

The obtained powdered catalyst 3 was put into a 30-ton pressing machine to immobilize the powder, crushed so that a particle diameter was in a range from 2 to 4 mm, and sifted, so that a catalyst 3 (the catalytic components: Mo, Co; and the carrier component: $ZrO_2/TiO_2$) was obtained.

Test Example 4

Change in Compositions and Materials in the Impregnation Method $TiO_2/MoO_3$ material used in the test example 1 were changed to an $85TiO_2$-$20Al_2O_3$ complex oxide/cobalt chloride/ammonium thiomolybdate, and the supported amount (wt %/wt %) of $CoO/MoO_3$ was maintained at 4/13. Other than the above, the same operations as those of the test example 1-1 were performed to obtain a powdered catalyst 4.

The obtained powdered catalyst 4 was put into a 30-ton pressing machine to immobilize the powder, crushed so that a particle diameter was in a range from 2 to 4 mm, and sifted, so that a catalyst 4 (the catalytic components: Mo, Co; and the carrier component: $ZrO_2/Al_2O_3$) was obtained.

Test Example 5

Change in Compositions and Materials in the Precipitation Method $TiO_2/MoO_3$ material used in the test example 1-2 were changed to a $20CeO_2$-$80TiO_2$ complex oxide/molybdophosphoric acid, and the supported amount (wt %/wt %) of $CoO/MoO_3$ was changed to 9/6. Other than the above, the same operations as those of the test example 1-2 were performed to obtain a powdered catalyst 5.

The obtained powdered catalyst 5 was put into a 30-ton pressing machine to immobilize the powder, crushed so that a particle diameter was in a range from 2 to 4 mm, and sifted, so that a catalyst 5 (the catalytic components: Mo, Co; and the carrier component: $CeO_2/TiO_2$) was obtained.

Test Example 6

Change in Compositions and Materials in the Precipitation Method $TiO_2/MoO_3$ material used in the test example 1-2 were changed to an $80OCeO_2$-$20ZrO_2$ complex oxide/cobalt chloride/ammonium thiomolybdate, and the supported amount (wt %/wt %) of CoO/MoO3 was changed to 4/15. Other than the above, the same operations as those of the test example 1-2 were performed to obtain a powdered catalyst 6.

The obtained powdered catalyst 6 was put into a 30-ton pressing machine to immobilize the powder, crushed so that a particle diameter was in a range from 2 to 4 mm, and sifted, so that a catalyst 6 (the catalytic components: Mo, Co; and the carrier component: $CeO_2/ZrO_2$) was obtained.

Test Example 7

Change in Compositions and Materials in the Precipitation Method $TiO_2/MoO_3$ material used in the test example 1-2 were changed to a $15SiO_2$-$85Al_2O_3$ complex oxide/cobalt sulfate, and the supported amount (wt %/wt %) of $CoO/MoO_3$ was changed to 3/12. Other than the above, the same operations as those of the test example 1-2 were performed to obtain a powdered catalyst 7.

The obtained powdered catalyst 7 was put into a 30-ton pressing machine to immobilize the powder, crushed so that a particle diameter was in a range from 2 to 4 mm, and sifted, so that a catalyst 7 (the catalytic components: Mo, Co; and the carrier component: $SiO_2/Al_2O_3$) was obtained.

Test Example 8

Change in Compositions and Materials in the Coprecipitation Method $TiO_2/MoO_3$ material used in the test example 1-2 were changed to a $95TiO_2$-$5SiO_2$ complex oxide/cobalt sulfate, and the supported amount (wt %/wt %) of $CoO/MoO_3$ was changed to 5/7. Other than the above, the same operations as those of the test example 1-2 were performed to obtain a powdered catalyst 8.

The obtained powdered catalyst 8 was put into a 30-ton pressing machine to immobilize the powder, crushed so that a particle diameter was in a range from 2 to 4 mm, and sifted, so that a catalyst 8 (the catalytic components: Mo, Co; and the carrier component: $SiO_2/TiO_2$) was obtained.

Test Example 9

Change in Compositions and Materials in the Sol-Gel Method $TiO_2/MoO_3$ material used in the test example 1-4 were changed to $CeO_2$ manufactured by DAIICHI KIGENSO KAGAKU KOGYO CO., LTD./cobalt acetate/sodium molybdate, and the supported amount (wt %/wt %) of $CoO/MoO_3$ was changed to 7/8. Other than the above, the same operations as those of the test example 1-4 were performed to obtain a powdered catalyst 9.

The obtained powdered catalyst 9 was put into a 30-ton pressing machine to immobilize the powder, crushed so that a particle diameter was in a range from 2 to 4 mm, and sifted, so that a catalyst 9 (the catalytic components: Mo, Co; and the carrier component: $CeO_2$) was obtained.

Test Example 10

Change in Compositions and Materials in the Sol-Gel Method $TiO_2/MoO_3$ material used in the test example 1-4 were changed to a $10ZrO_2$-$90Al_2O_3$ complex oxide/cobalt acetate/molybdophosphoric acid, and the supported amount (wt %/wt %) of $CoO/MoO_3$ was changed to 8/18. Other than the above, the same operations as those of the test example 1-4 were performed to obtain a powdered catalyst 10.

The obtained powdered catalyst 10 was put into a 30-ton pressing machine to immobilize the powder, crushed so that a particle diameter was in a range from 2 to 4 mm, and sifted, so that a catalyst 10 (the catalytic components: Mo, Co; and the carrier component: $ZrO_2/Al_2O_3$) was obtained.

Test Example 11

Change in Compositions and Materials in the Co-Sol-Gel Method $TiO_2$ material used in the test example 1-5 was changed to ethyl silicate $Si(OC_2H_5)_4$, and the supported amount (wt %/wt %) of $CoO/MoO_3$ was changed to 6/14. Other than the above, the same operations as those of the test example 1-5 were performed to obtain a powdered catalyst 11.

The obtained powdered catalyst 11 was put into a 30-ton pressing machine to immobilize the powder, crushed so that a particle diameter was in a range from 2 to 4 mm, and sifted, so that a catalyst 11 (the catalytic components: Mo, Co; and the carrier component: $SiO_2$) was obtained.

Comparative Example 1

$TiO_2$ used in the test example 1-1 was changed to $Al_2O_3$ manufactured by HAYASHI PURE CHEMICAL IND., LTD. Other than the above, the same operations as those of the test example 1-1 were performed to obtain a comparative powdered catalyst 1.

The obtained comparative powdered catalyst 1 was put into a 30-ton pressing machine to immobilize the powder, crushed so that a particle diameter was in a range from 2 to 4 mm, and sifted, so that a comparative catalyst 1 (the catalytic components: Mo, Co; and the carrier component: $Al_2O_3$) was obtained.

Comparative Example 2

An alkaline solution A was prepared by dissolving 2.5 mol % of sodium carbonate in 2 L of water and maintaining the temperature of the solution at 60° C. An acid solution B was prepared by dissolving 0.123 mol of aluminum nitrate and 0.092 mol of zinc nitrate in 400 ml of water and maintaining the temperature of the solution at 60° C. An acid solution C was prepared by dissolving 0.22 mol of cupric nitrate in 400 ml of water and maintaining the temperature of the solution at 60° C.

Droplets of the solution B were uniformly added to the solution A for 30 minutes while the mixture was kept stirred, so that a precipitate-produced solution D was obtained. Then, droplets of the solution C were uniformly added to the precipitate-produced solution D for 30 minutes, so that a precipitate-produced solution F containing aluminum, zinc, and copper was obtained.

The precipitate-produced solution F was aged by being stirred for 2 hours, and filtrate obtained from the precipitate-produced solution F was adequately cleaned so that Na ion and NO ion were not detected. Then, the resultant solution was dried at 100° C. for 24 hours and fired at 300° C. for 3 hours, so that a comparative powdered catalyst was obtained. This comparative powdered catalyst is described as a comparative powdered catalyst 2.

The obtained comparative powdered catalyst 2 was put into a 30-ton pressing machine to immobilize the powder, crushed so that a particle diameter was in a range from 2 to 4 mm, and sifted, so that a comparative catalyst 2 (the catalytic components: Cu, Zn; and the carrier component: $Al_2O_3$) was obtained.

Comparative Example 3

0.098 mol of the same aluminum nitrate as that of the comparative example 2 was used, 0.144 mol of ferric nitrate was used instead of zinc nitrate, and 0.079 mol of chromium nitrate was used instead of the cupric nitrate. Other than the above, the same operations as those of the comparative example 2 were performed to obtain a comparative powdered catalyst 3.

The obtained comparative powdered catalyst 3 was put into a 30-ton pressing machine to immobilize the powder, crushed so that a particle diameter was in a range from 2 to 4 mm, and sifted, so that a comparative catalyst 3 (the catalytic components: Cr, Fe; and the carrier component: $Al_2O_3$) was obtained.

The tests were performed as follows. 15.8 cc of a catalyst was added to a tubular reaction tube with an inner diameter of 20 mm, and the catalytic activity was evaluated by a device that can control gas compositions and a gas flow rate by a mass flow controller and that can control the temperature of a catalytic layer by an electric furnace.

The evaluation conditions were as follows: $H_2/CO/CO_2$=30/50/20 mol %; S/CO=2.0; the pressure was 0.1 PMa; and the temperature was 350° C. The amount of gas was 1500 $h^{-1}$ (23.7 L/h).

The catalytic activities were compared with one another based on the following CO conversion rate as a parameter defined by a change in the gas flow rate between an inlet and an outlet of the catalytic layer.

The CO conversion rate (%)=(1−(the CO gas flow rate (mol/h) at the outlet of the catalytic layer)/(the CO gas flow rate (mol/h) at the inlet of the catalytic layer).

As the hydrogen-chloride exposure test, the CO conversion rate was obtained after exposure for 150 hours at the HCl concentration of 100 ppm.

The test results are shown in Table 1.

TABLE 1

| Catalyst No. | Catalytic component MoO₃ Supported amount (wt %) | Catalytic component CoO Supported amount (wt %) | Carrier Carrier component (oxide) | Carrier component ratio (wt %/wt %) | Preparation method | Specific surface area (m²/g) Initial state→After HCl exposure | CO conversion rate (%) at 350° C. Initial state→After HCl exposure |
|---|---|---|---|---|---|---|---|
| 1-1 | 13 | 4 | TiO₂ | 100 | Impregnation | 78→75 | 70→68 |
| 1-2 | 13 | 4 | TiO₂ | 100 | Precipitation | 70→62 | 68→63 |
| 1-3 | 13 | 4 | TiO₂ | 100 | Coprecipitation | 75→68 | 65→60 |
| 1-4 | 13 | 4 | TiO₂ | 100 | Sol-gel | 73→66 | 66→59 |
| 1-5 | 13 | 4 | TiO₂ | 100 | Copolymer gel | 71→63 | 68→62 |
| 2 | 10 | 2 | ZrO₂ | 100 | Impregnation | 84→82 | 75→73 |
| 3 | 11 | 5 | ZrO₂/TiO₂ | 15/85 | Impregnation | 86→86 | 80→78 |
| 4 | 13 | 4 | TiO₂/Al₂O₃ | 80/20 | Impregnation | 112→91 | 78→69 |
| 5 | 6 | 9 | CeO₂/TiO₂ | 20/80 | Precipitation | 110→101 | 72→63 |
| 6 | 15 | 4 | CeO₂/ZrO₂ | 80/20 | Precipitation | 77→70 | 69→64 |
| 7 | 12 | 3 | SiO₂/Al₂O₃ | 15/85 | Precipitation | 154→122 | 79→61 |
| 8 | 7 | 5 | SiO₂/TiO₂ | 5/95 | Coprecipitation | 58→52 | 76→70 |
| 9 | 8 | 7 | CeO₂ | 100 | Sol-gel | 36→29 | 59→49 |
| 10 | 18 | 8 | ZrO₂/Al₂O₃ | 15/85 | Sol-gel | 123→96 | 72→65 |
| 11 | 14 | 6 | SiO₂ | 100 | Copolymer gel | 45→40 | 61→55 |
| Comparative example 1 | 13 | 4 | Al₂O₃ | 100 | Impregnation | 96→37 | 60→27 |
| Comparative example 2 | CuO (35) | ZnO (15) | Al₂O₃ | 100 | Coprecipitation | 54→22 | 5→0 |
| Comparative example 3 | Cr₂O₃ (12) | Fe2O3 (78) | Al₂O₃ | 100 | Coprecipitation | 71→31 | 55→6 |

As shown in table 1, all of the catalysts according to the test examples had good CO conversion rates even after exposure to HCl. By contrast, the catalysts according to the comparative examples had largely-reduced CO conversion rates and one of them was deactivated. Furthermore, the specific surface areas of the catalysts according to the test examples were not largely reduced even after the exposure. By contrast, the specific surface areas of the catalysts according to the comparative examples were reduced to less than half.

Therefore, it is confirmed that the catalysts of the present invention are useful as a CO shift catalyst that is resistant to halogen.

Test Example 12

50 parts of Kaolin, 10 parts of cellulose acetate, and ion-exchange water were added to 100 parts of the powdered catalyst 1-1 obtained in the test example 1-1. The mixture was kneaded in air for 5 minutes and further kneaded in vacuum for 5 minutes. Thereafter, the mixture was extruded through a lattice die with 4.2 mm·p (where p is a value obtained by adding the size of openings through which the gas flows and an inner wall value) and with an inner wall thickness of 0.6 mm, dried, and fired at 500° C. for 2 hours, so that a honeycomb catalyst 12 was obtained.

Test Example 13

The powdered catalyst 1-1 used in the test example 12 was changed to the powdered catalyst 8. Other than the above, the same operations as those of the test example 12 were performed to obtain a honeycomb catalyst 13.

Comparative Example 4

The powdered catalyst 1-1 used in the test example 12 was changed to the comparative powdered catalyst 1. Other than the above, the same operations as those of the test example 12 were performed to obtain a comparative catalyst 4.

The test results are shown in Table 2. The tests were performed in the same manner as described above.

TABLE 2

| Catalyst No. | Catalytic component MoO₃ Supported amount (wt %) | Catalytic component CoO Supported amount (wt %) | Carrier component (oxide) | Structure of catalyst | CO conversion rate (%) at 350° C. |
|---|---|---|---|---|---|
| 12 | 13 | 4 | TiO₂ | Honeycomb | 75→74 |
| 13 | 18 | 8 | SiO₂/TiO₂ | Honeycomb | 76→69 |
| Comparative example 4 | 13 | 4 | Al₂O₃ | honeycomb | 60→27 |

As a result of the tests using the honeycomb catalysts prepared with the catalysts of the test examples 1 and 8, it is confirmed that the honeycomb catalysts have substantially the same properties as those of the press molded catalyst. Therefore, it is possible to reduce pressure loss than that of the press molded catalyst.

INDUSTRIAL APPLICABILITY

As described above, according to the CO shift catalyst of the present invention, it is possible to prevent deterioration due to halogen that is contained in coal when the coal is gasified in a coal gasifier. Therefore, it is possible to significantly reduce restrictions on set-up locations of the shift reactor. As a result, it is possible to provide a highly efficient gas purification process with good thermal efficiency.

REFERENCE SIGNS LIST 10 gasified gas purification system
11 gasifier
12 gasified gas
13 filter
14 CO shift catalyst
15 CO shift reactor
16 wet scrubber
17 first heat exchanger

The invention claimed is:

1. A CO shift catalyst that reforms carbon monoxide (CO) in a gas, comprising:
   an active ingredient of both of molybdenum (Mo) and cobalt (Co); and
   a carrier for supporting the active ingredient, wherein the carrier is either one of the following:
   (a) a complex oxide of cerium (Ce) and titanium (Ti);
   (b) a complex oxide of cerium (Ce) and zirconium (Zr);
   (c) a complex oxide of silicon (Si) and aluminum (Al);
   (d) a complex oxide of silicon (Si) and titanium (Ti); and
   (e) a complex oxide of zirconium (Zr) and aluminum (Al);
   an additive amount of molybdenum (Mo) is 6 to 18% by weight, and
   an additive amount of cobalt (Co) is 3 to 9% by weight.

2. A CO shift reactor comprising a reactor that is filled with the CO shift catalyst according to claim 1.

3. A method for purifying gasified gas comprising:
   removing soot and dust from gasified gas containing halide by using a filter, the gasified gas being obtained by a gasifier;
   causing a CO shift reaction by using a CO shift catalyst;
   cleaning the gasified gas by a wet scrubber after the CO shift reaction; and
   removing carbon dioxide from the gasified gas after the cleaning, wherein the CO shift catalyst includes:
   an active ingredient of both molybdenum (Mo) and cobalt (Co); and
   a carrier for supporting the active ingredient, the carrier being either one of the following:
   (a) a complex oxide of cerium (Ce) and titanium (Ti);
   (b) a complex oxide of cerium (Ce) and zirconium (Zr);
   (c) a complex oxide of silicon (Si) and aluminum (Al);
   (d) a complex oxide of silicon (Si) and titanium (Ti); and
   (e) a complex oxide of zirconium (Zr) and aluminum (Al);
   an additive amount of molybdenum (Mo) is 6 to 18% by weight, and
   an additive amount of cobalt (Co) is 3 to 9% by weight.

* * * * *